United States Patent [19]

Prendergast

[11] Patent Number: 4,737,287

[45] Date of Patent: Apr. 12, 1988

[54] FLUID FLOW APPARATUS

[75] Inventor: Gavan J. J. Prendergast, Mount Waverley, Australia

[73] Assignee: Noel Carroll, Sherbooke, Australia

[21] Appl. No.: 852,666

[22] PCT Filed: Jul. 19, 1985

[86] PCT No.: PCT/AU85/00161

§ 371 Date: May 12, 1986

§ 102(e) Date: May 12, 1986

[87] PCT Pub. No.: WO86/00828

PCT Pub. Date: Feb. 13, 1986

[30] Foreign Application Priority Data

Jul. 19, 1984 [AU] Australia ........................ PG6098/84
Aug. 2, 1984 [AU] Australia ........................ PG6356/84

[51] Int. Cl.[4] ........................................... B01D 17/038

[52] U.S. Cl. ................................ 210/512.2; 209/144; 209/211

[58] Field of Search ..................... 210/512.2, 304, 788; 209/144, 211

[56] References Cited

U.S. PATENT DOCUMENTS 4,244,748 1/1981 Chwalek et al. ...................... 127/67
4,605,495 8/1986 Flynn .............................. 210/512.2

*Primary Examiner*—Frank Sever
*Attorney, Agent, or Firm*—Ladas & Parry

[57] ABSTRACT

Provided is a system of process components which will enable conversion of a bank of hydrocyclones from parallel operation to series operation and vice versa.

19 Claims, 8 Drawing Sheets

FLUID FLOW APPARATUS

This invention relates to a fluid flow apparatus.

In one aspect, the invention is particularly concerned with fluid flow apparatus of the kind having two fluid flow devices through which fluid flow is in use to be directed and in respect of which it is desired to provide for interconnection of these devices in a fashion permitting flow either in parallel or in series through the devices. The invention has particular, but not exclusive, application in fluid flow apparatus such as cyclone separator banks for separating liquid components in a multiphase liquid mixture.

In one aspect, the invention provides fluid flow apparatus comprising two devices which are in use subjected to a fluid flow therethrough, from an inlet to an outlet, the inlets of the devices being connected to a common inlet duct and the outlets of the devices being connected to a common outlet duct; said apparatus also including a connecting duct interconnecting said inlet duct and said outlet duct, at locations respectively between the connections of inlets of the devices to the inlet duct and between the connections of the outlets of the devices to the outlet duct, and valve means selectively operable to direct fluid to be separated, and passed into said inlet duct, through the inlet of each device from said inlet duct, whilst directing fluid emerging from said outlets to said outlet duct, said valve means also being selectively operable to divert said fluid passed into said inlet duct from direct passage from the inlet duct to the inlet of one of said devices, whilst permitting inlet to the inlet of the other device and to direct fluid from the outlet of the other device, and entering into the outlet duct, through said connecting duct and thence to the inlet of said one device via said inlet duct, and whilst preventing fluid emerging from the outlet of said other device from mixing in said outlet duct with fluid from the outlet of said one device.

Preferably, the inlet and outlet ducts are arranged in generally parallel relationship, with the valve means comprising a first valve in said inlet duct and a second valve in said outlet duct, said first valve being at a location between spaced locations at which the respective inlets of the two devices join the inlet duct, whereby the inlet duct defines first and second portions to respective opposite sides of the first valve, and said second valve being at a location between spaced locations at which the outlets of the two devices join the outlet duct, whereby the outlet duct defines first and second portions to respective opposite sides of the second valve, said valves being interconnected by said connecting duct, said first valve being effective, in one condition, to direct fluid entering said first portion of the inlet duct successively through the first and second portions of the inlet duct for entry into the inlets of the two devices then coupled in parallel and the first valve being effective in another condition to block flow from the first portion of the inlet duct to the second portion thereof, whilst permitting flow from the connecting duct through the first valve means into the second portion of the inlet duct and precluding such flow to the first portion of the inlet duct, the second valve being effective, in one condition, to permit fluid flow between the first and second portions of the outlet duct to direct flow from both devices, when coupled in parallel, to the outlet duct and, in another condition, being effective to direct fluid flowing from said other device, into said first portion of the outlet duct, from the first portion of the outlet duct into said connecting duct and to prevent flow from the first to the second portion of the outlet duct; at least one of said valves, or another valve forming part of said valve means, being effective to prevent flow through the connecting duct when the first and second valves are in said one conditions.

Preferably, the devices are coupled to the inlet and outlet ducts by further valves, and are demountable from the apparatus, with the said further valves closed.

Where the devices comprise axially extending cyclone separators with inlets for inflow of fluid to be separated, and having axially opposed underflow and overflow outlets for outlet of respective dense and less dense components of separated fluid, the said inlet of each device may comprise the inlet of a respective cyclone separator and the outlet of each device may comprise the underflow outlet of a respective cyclone separator.

In another aspect this invention relates to a cyclone separator for separating fluid components such as liquid components in a liquid mixture and having an elongate separating chamber which has a larger cross-sectioned end and an opposite smaller cross-sectioned end, the separating chamber having at least one inlet for liquid to be separated and an overflow outlet opening at a larger cross-sectioned end of the separating chamber, for outflow of the less denser of said components, the separating chamber also having an underflow outlet at the smaller cross sectioned end of the separating chamber, for outflow of the denser of said components. The invention is particularly, but not exclusively, concerned with separators of this kind and which are specifically adapted for separating oil and water.

U.S. Pat. No. 4,237,006 (Colman et al) describes a cyclone separator of the above kind, the separating chamber having first, second and third contiguous cylindrical portions arranged in that order, the first cylindrical portion being of greater diameter than the second cylindrical portion and the third cylindrical portion being of lesser diameter than the second cylindrical portion, the overflow outlet of the separator communicating with the first cylindrical portion at the end thereof opposite to said second cylindrical portion and there being a plurality of tangentially directed feed inlets communicating with the first cylindrical portion. My International application PCT/AU83/00028 entitled "Cyclone Separator" and filed Feb. 28, 1983 also describes a similar type of separator.

Conventionally such separators may be formed from a shaped liner of stainless steel housed within an outer pressure vessel which provides protection in case the liner bursts, or in the event of a fire. The production of the shaped liner normally involves expensive machining operations.

The present invention in this aspect relates to a separator construction which can be more easily and less expensively produced.

According to this aspect of the present invention there is provided a cyclone separator comprising a separating chamber formed by material moulded in situ within an outer reinforcing casing.

The invention is further described by way of example only with reference to the accompanying drawings in which.

Figure 1:
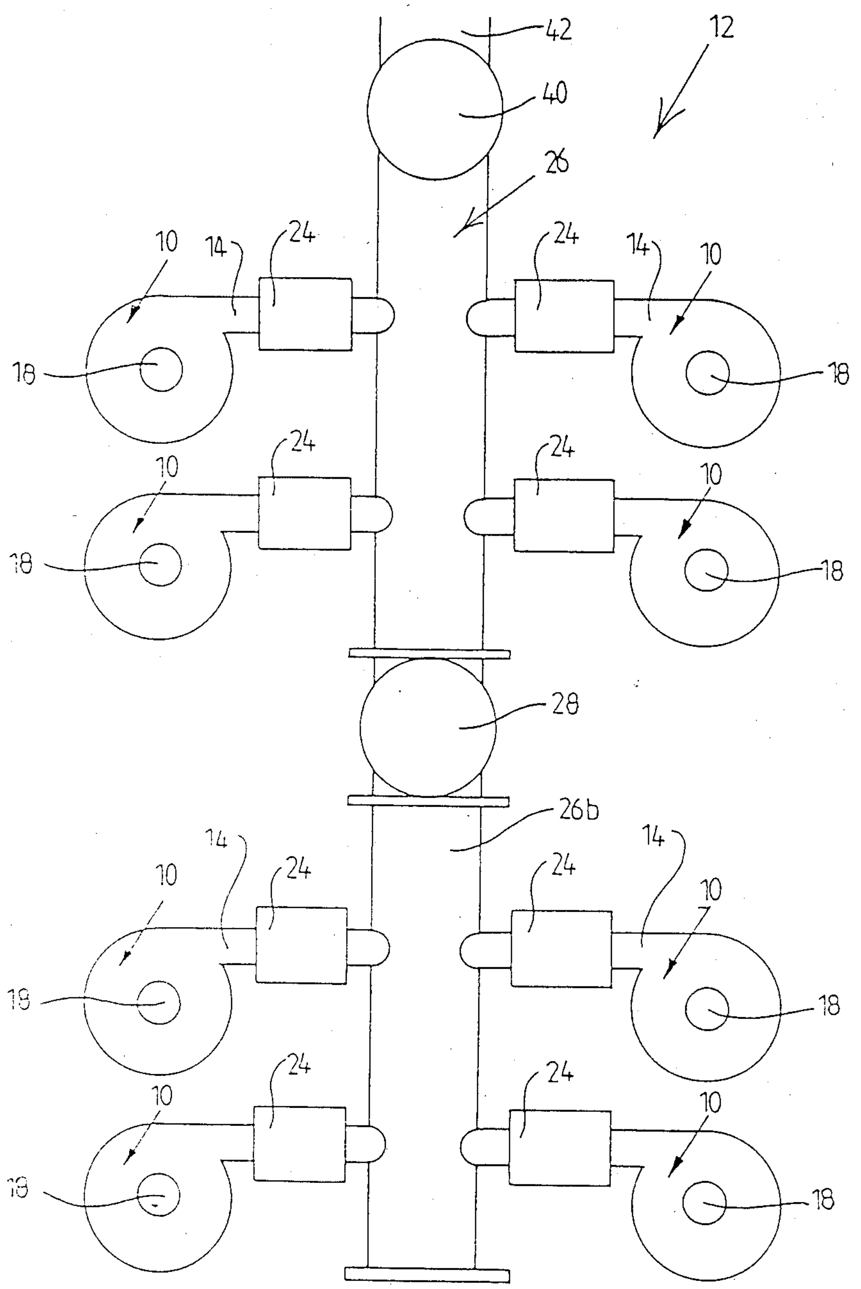
FIG. 1 is an end view of a separator bank constructed in accordance with the invention.
Figure 2:
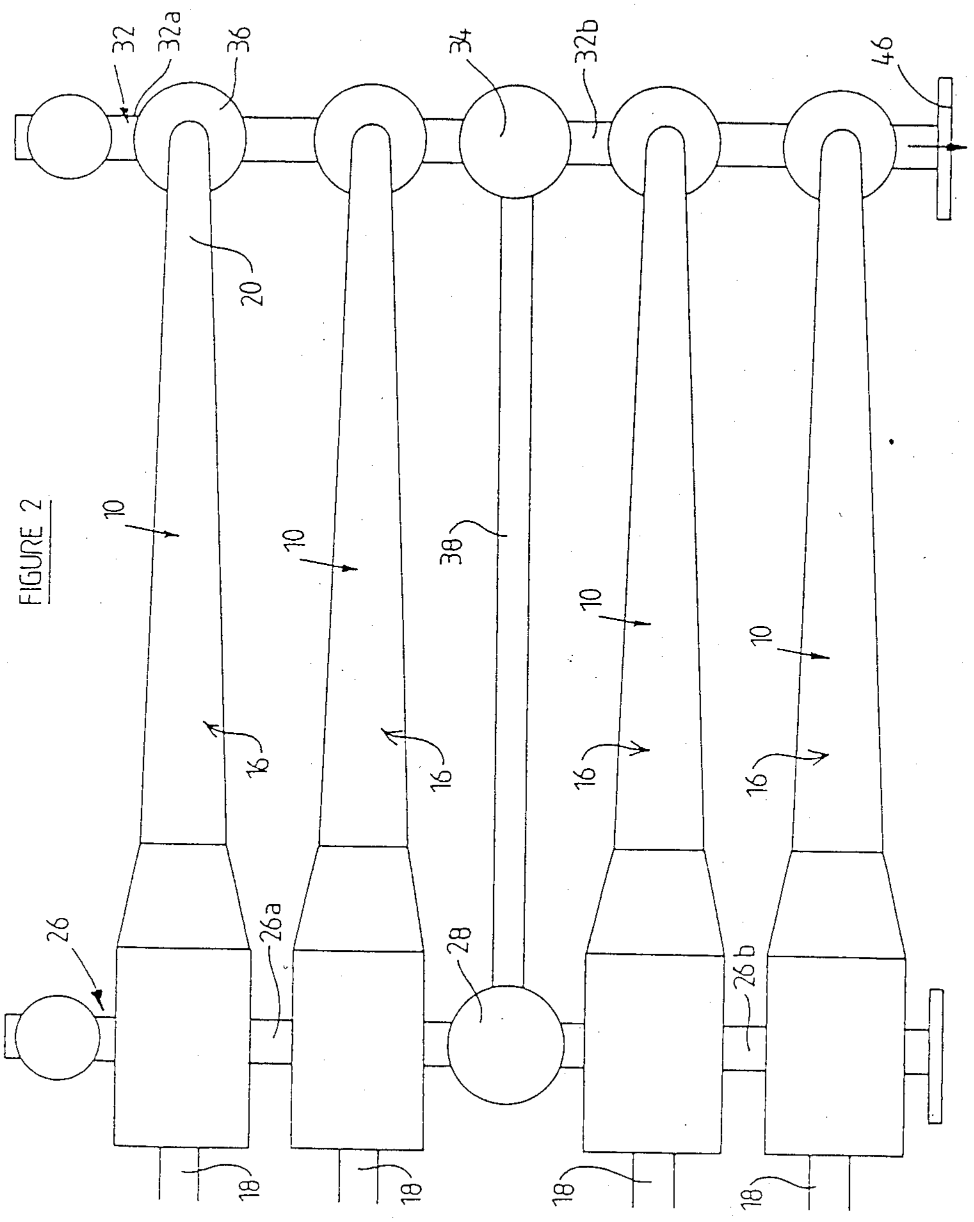
FIG. 2 is a side view of the bank of FIG. 1.
Figure 3:
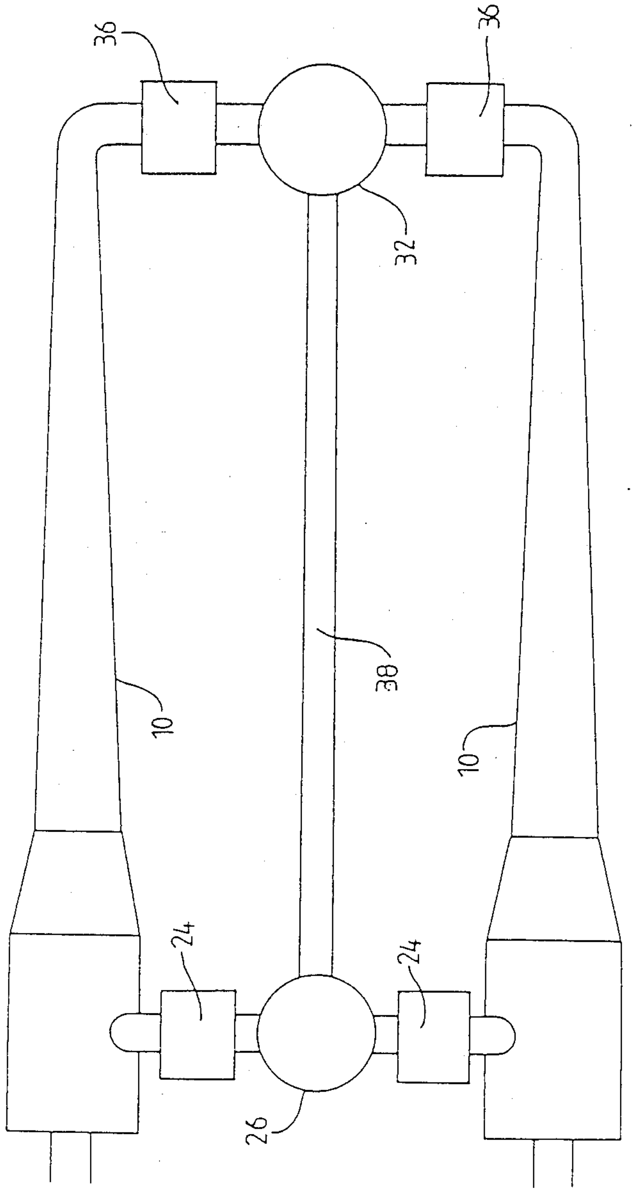
FIG. 3 is a plane view of the bank of FIG. 1.
Figure 5:
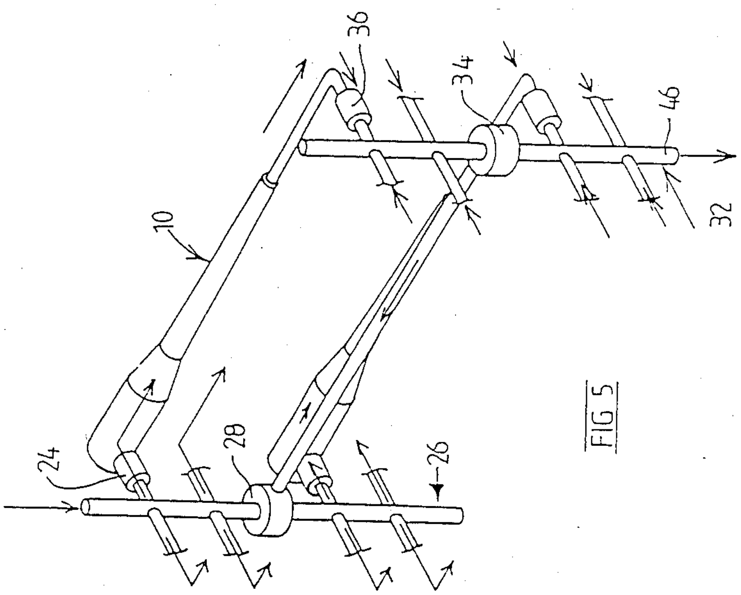
FIGS. 4 and 5 are perspective diagrams of the bank of FIG. 1, showing two alternative modes of operation of the bank of FIG. 1.

In FIGS. 1 to 6, eight cyclone separators 10 are shown arranged in a bank 12. The separators 10 are suitable for separating less dense and more dense liquid components from a liquid mixture and may for example be constructed in accordance with the teachings of U.S. patent specification No. 4,237,006. These separators 10 are characterised by having a separating chamber 16 of elongate cylindrical form, tapering from one end to the other and having, at one end at least one tangential inlet 14 and also having, at that end, an overflow outlet 18. At the other end of the separating chambers 16, the separating chambers lead to underflow outlets 20. The inlets 14 of the eight separators 10 are each connected via valves 24 to an inlet duct 26. Duct 26 is vertical and is formed in two superposed portions 26*a* and 26*b*, portion 26*a* being above portion 26*b* and interconnected to portion 26*b* via a valve 28. Four of the valves 24 are connected to portion 26*a* and four are connected to portion 26*b*.

The four connected to portion 26*a* of duct 26 are arranged to a treed fashion with two pairs one to either side of the duct 26. The separators 10 are arranged in pairs one to either side of the duct portion 26*a*, and with one separator 10 of each of these pairs being positioned immediately above a corresponding one of the two separators of the other pair. Similarly, valves 24 and separators 10 connected to portion 26*b* are coupled in a corresponding arrangement to the valves 24 associated with portion 24*a*.

The bank of separators also includes an outlet duct 32 formed in two portions 32*a*, 32*b*. Duct 32 is upright and parallel to duct 26 with portion 32*a* being above portion 32*b* and being interconnected to portion 32*b* via a valve 34. The underflow outlets 20 of the separators 10 are connected to the duct 32 via valve 36. The valves 36 are arranged in a treed arrangement similar to that of the valves 24 so that there are four such valves 36 connected to portion 32*a* and four connected to portion 32*b*.

By virtue of the above arrangement, there are four of the separators 10 to one side of the upright plane containing the axes of ducts 26 and 32 and four to the other side of that plane whilst there are, also, four upper separators connected to the duct portions 26*a*, 32*a* and four, lower, separators 10 connected to the duct portions 26*b*, 32*b*.

The valves 28 and 34 are also connected one to the other via a connecting duct 38.

Figure 4:
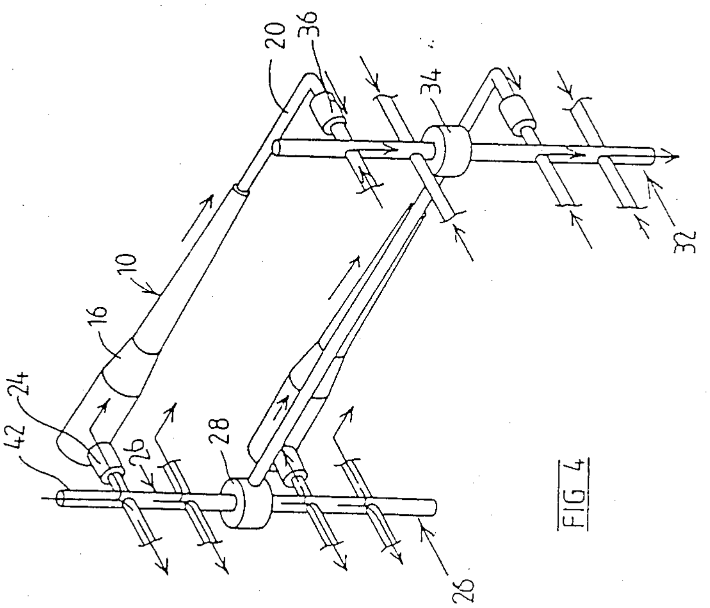

In operation, liquid to be separated is passed into duct 26 from an inlet 42 at the upper end thereof via, for example, the valve 40 shown and withdrawn from an outlet 46 at the lower end of duct 36. By conditioning valves 28 and 34 appropriately, however, the paths of movement of the liquid through the separator bank may be varied to accord with either the path shown in FIG. 4 or that shown in FIG. 5. In FIG. 4, valves 28 and 34 are operated so that flow from duct portion 26*a* to duct portion 26*b* may occur freely and flow may likewise occur from duct portion 32*a*, through valve 34 and duct portion 32*b* to outlet 46. In this condition, the valves are operated so that no flow occurs through duct 38. Thus, in this configuration, the inlet liquid passing into the duct 26 flows directly into duct portion 26*a* and into portion 26*b* through the valve 24, thence into the inlets 14 to supply the separators 10 in parallel. The separated liquid component emerging from the underflow outlets of the separators, being the denser component of the inlet liquid mixture, passes into the duct 32, particularly passing through the duct portions 32*a*, 32*b*, and through valve 34 to be exhausted via outlet 46. In the configuration shown in FIG. 5, however, the valves 28 and 34 are manipulated so that flow from duct portion 26*a* to duct portion 26*b* is precluded, at the same time valve 28 being effective to provide communication to duct 38 from duct portion 28*b*. On the other hand, valve 34 is, in this configuration, arranged to preclude liquid flow from duct portion 32*a* to duct portion 32*b* whilst providing communication between portion 32*a* and duct 38. Thus, in this configuration, flow of liquid into the separator occurs as before via inlet 42 and duct portion 26*a* to flow via the valves 24 of the uppermost four separators 10 into the uppermost four separators 10 only. Flow from the underflow outlets of these separators is directed via the uppermost four valves 36 into the duct portion 32*a*, thence through valve 34 into duct 38 and via valve 28 into duct portion 26*b*. The liquid thus admitted into portion 26*b* is directed via the lowermost valves 24 into the four lowermost separators 10. Liquid emerging from the underflow outlets of the four lowermost separators 10 is passed via valves 36 into duct portion 32*b* from thence it is removed from the separator bank via the outlet 46.

The described arrangement provides substantial flexibility in operation since, in the event that a satisfactory separating efficiency should be achieved in the sense that there is little contamination by the less dense liquid component of the inlet liquid in the heavier component of the liquid mixture appearing at the underflow outlet from all of these separators 10 the bank may be operated in the configuration of FIG. 4, so providing maximum treatment capacity. In the event, however, that separating efficiency should drop in that the liquid appearing at the underflow outlets of the separators 10 is contaminated to a greater degree than is desired (with the lighter component of the inlet liquid) the bank may be reverted to the mode of operation in FIG. 5 where liquid from the underflow outlets of the upper separators 10 is recirculated for further separation in the lowermost separators 10.

Although not shown, for simplicity, the overflow outlets 18 of all of the separators, which overflow outlets deliver the less dense component of the separated mixture therefrom may be all connected together to a common less dense component outlet.

Figure 6:
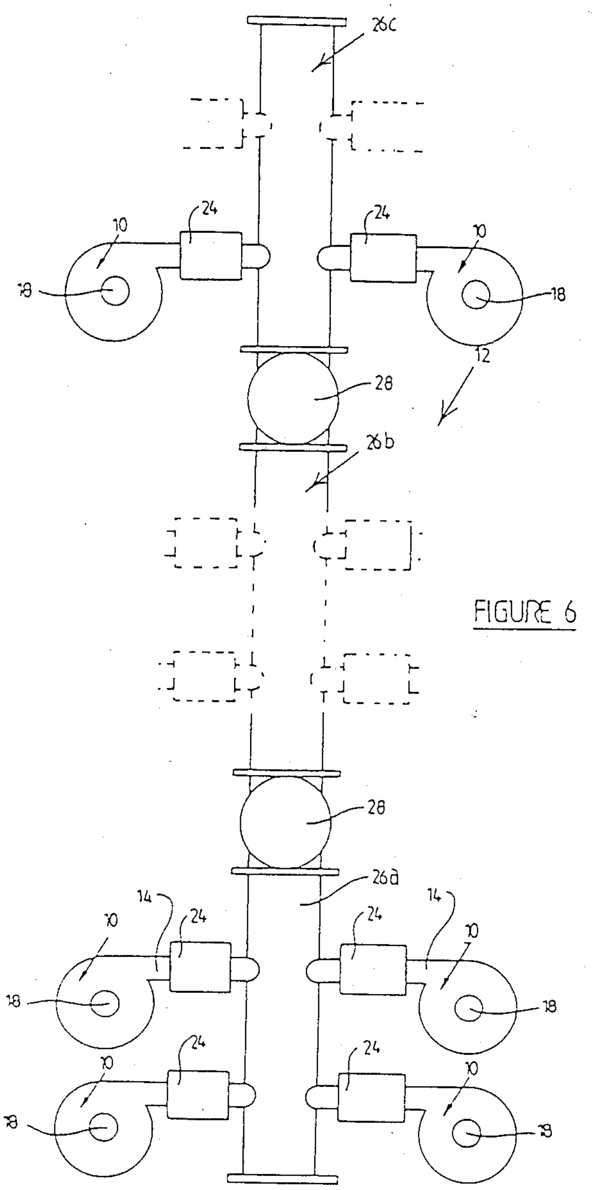
FIG. 6 is a diagrammatic end view of a modification of the separator bank of FIG. 1.

Further flexibility of operation may be achieved in the bank shown by providing that the separators 10 may be readily disconnectable, such as by unbolting from the valves 24 and 36 so that, by closing valves 24 and 36 associated with any particular separator 10, that separator may be removed from the operating system for repair or replacement. Furthermore, it is preferred that the duct portions 26*a*, 26*b* and 32*a*, 32*b* be removably connectable together via valves 28 and 34 and be arranged at free ends of the upper duct portions *26a, 32a* for connection to further respective duct portions (like duct portions *26a, 26b* or *32a, 32b*) so that a further set of four separators 10 may be connected in like fashion between extended inlet and outlet ducts constituted by, respectively the portions *26a, 26b* together with a freshly added portion, and the duct portions *32a, 32b* and a freshly added portion thereto. Such an arrangement is shown in FIG. 6 where duct portions *26a, 26b, 26c* are shown interconnected by valves 28. In this case, for example, each portion of the ducts 26, 32 has more than four valves 24, 36. By providing connecting pipes between pairs of valves 28, 34 this arrangement permits circulation of liquid to be separated through three successive separators 10. In similar fashion, the bank may be extended further vertically by addition of still further duct portions. If desired, valves like valves 28, 34 may be provided between each adjacent pair of duct portions in duct 26 and between each adjacent pair of duct portions in duct 32 with further connecting ducts 38 connecting each pair of valves 28, 34 but this is not essential.

To provide further flexibility the separated banks may be readily adapted to lesser capacities than that shown by, for example, omitting the bank of separators to one side of the plane containing the axes of the upright inlet and outlet ducts 26, 32 and by closing the associated valves 24,36. This permits an installation to be made of adequate capacity to deal with some initial work load whilst permitting simple adaptation of the separator bank to cope with any subsequent increase in throughput as may be necessary.

The described arrangement has been found to be particularly satisfactory in a separator bank where the liquid mixture to be separated comprises oily water, that is to say where the mixture is predominately water.

Figure 7:
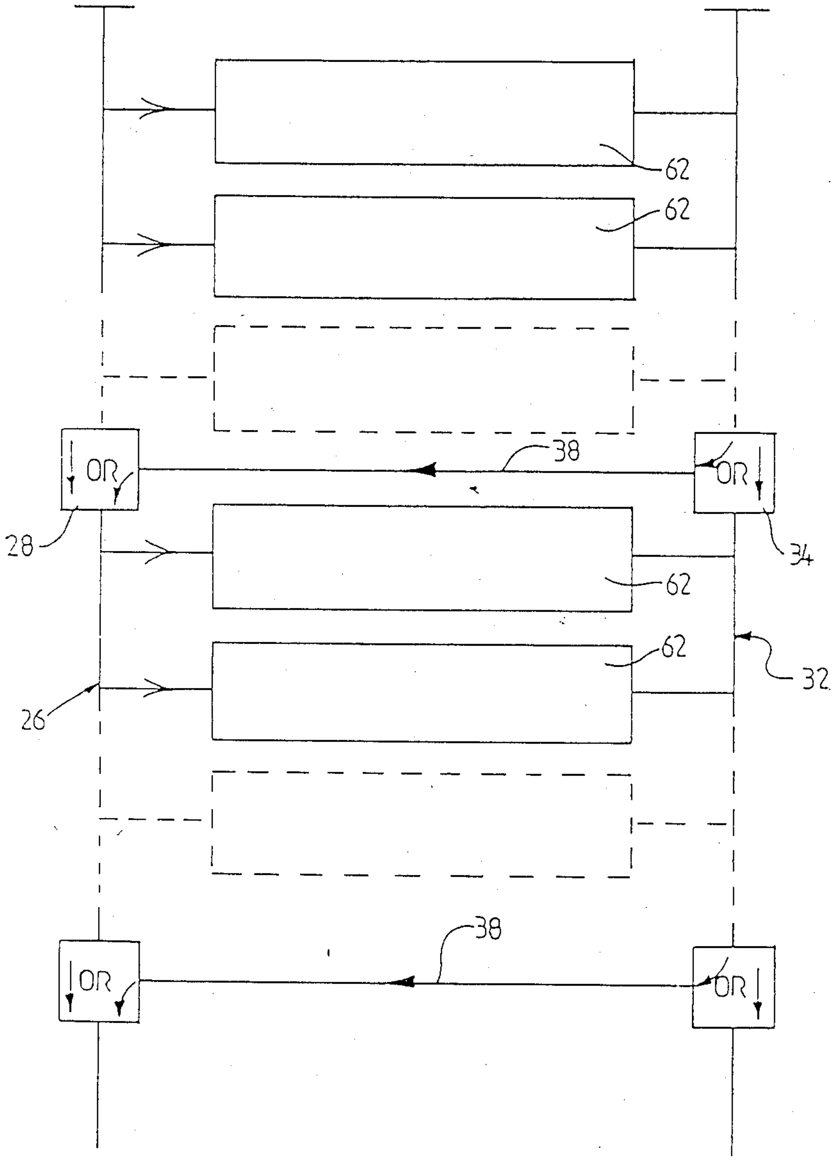
FIG. 7 is a diagram illustrating the general operating principle of the invention.

The invention can be applied to apparatus other than the described liquid separator bank. For example the bank 12 and separators 10 may be adapted for separating components of fluid mixtures other than the described liquid mixtures. Furthermore, the invention may be applied in apparatus employing devices other than separators. FIG. 7 shows a generalized system in accordance with the invention where system devices 62 adapted for fluid flow therethrough are connected by valves 28,34 between inlet and outlet ducts 26,32. These devices 62 may for example comprise fluid flow metering devices or fluid treatment devices.

The valves 24,36 may comprise conventional stop cocks. The valves 28,34 may be conventional three way valves of configuration as shown in FIGS. 8 to 11.

Figure 8:
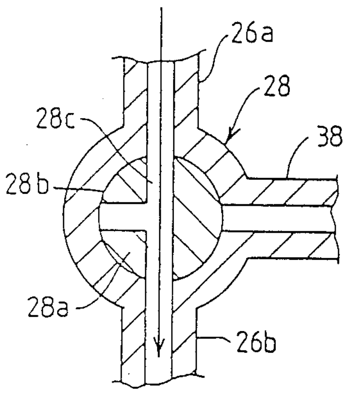
FIGS. 8 to 11 are cross-sectional diagrams of valves incorporated into the separator bank of FIGS. 1 to 5.
Figure 10:
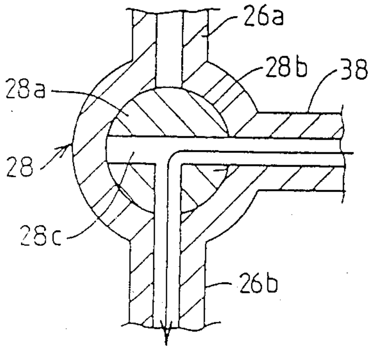

FIGS. 8 and 10 show a typical valve 28 as being a ball valve having a housing with a spherical cavity *28b* to which duct 38 and duct portions *26a, 26b* communicate. Valve 28 includes a rotatable ball *28a* in cavity *28b*, this having a T-shaped passageway *28c* therethrough.

Figure 9:
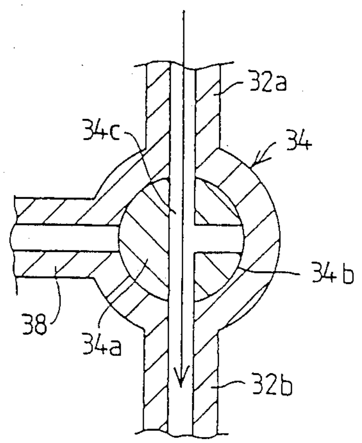
Figure 11:
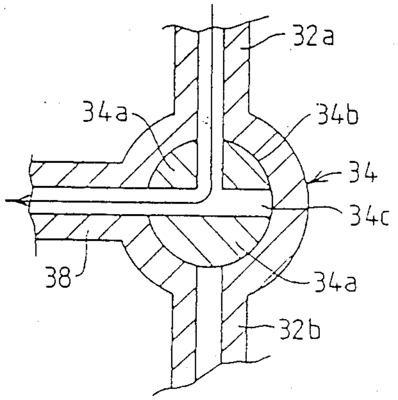

FIGS. 9 and 11 show valve 34 as likewise being formed as a ball valve with a spherical cavity *34b* to which duct 38 and duct portions *32a, 32b* communicate. Valve 34 has a rotatable ball *34a* within cavity *34b* and ball *34a* has a T-shaped passageway *34c* therethrough.

FIGS. 8 and 9 show valves 28,34 conditioned for flow via passageways *28c, 34c* between respective pairs of duct portions *26a, 26b* and *32a, 32b* (as in FIG. 4) and FIGS. 10 and 11 show valves 28, 34 conditioned for flow respectively from duct 38 to duct portion *26b* via passageway *28c* and from duct portion *32a* to duct 38 via passageway *34c*.

Figure 12:
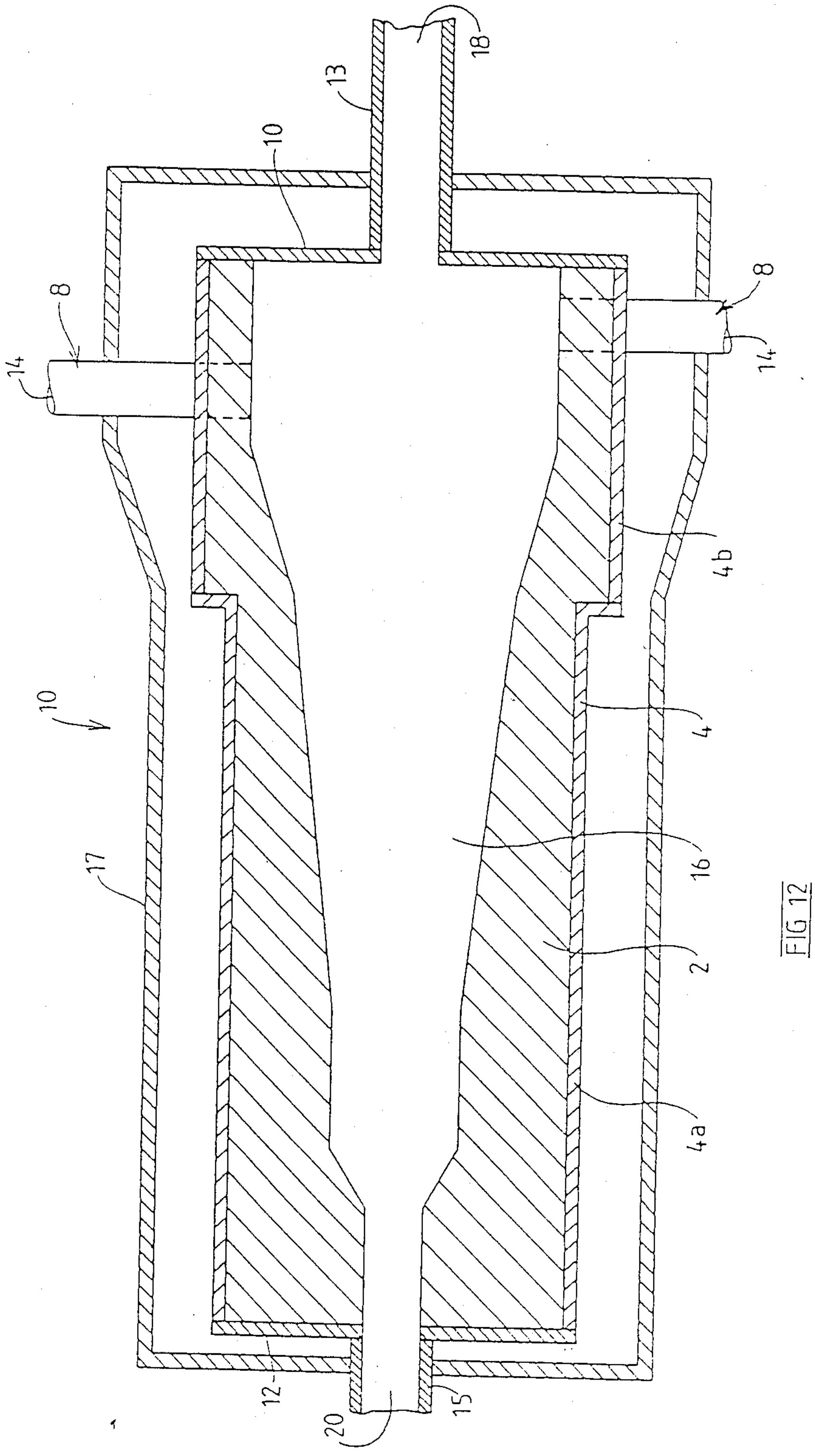
FIG. 12 is a longitudinal section of a cyclone separator in accordance with a preferred embodiment of the invention.

The cyclone separators 10 may be of the kind shown in FIG. 12. This separator 10 comprises a body formed by a plastics shell 2 moulded in situ within an outer metallic casing 4 which is retained in order to provide reinforcement for the moulded shell 2 when in use. The interior surface of the moulded shell is shaped to define the separating chamber 16.

More particularly, the outer metallic casing 4 comprises two lengths of steel tubing, preferably stainless steel tubing *4a, 4b*, of different diameters. The tubing *4a* of smaller diameter is flanged at one end for connection to the tubing *4b* of larger diameter. The larger diameter tubing *4b* primarily surrounds that end of the separating chamber having the larger cross-section. In order to produce the separator body, a mould insert having an outer profile equivalent to that of the required profile of the separating chamber 16 is mounted within the metallic casing 4. Inlet pipes 8 for forming the inlets 14 to the larger cross-sectioned end of the chamber 16 are inserted through apertures in the casing 4 with their inner ends abutting against the mould insert. Moulten plastics material is then injected into the mould cavity thus defined between the inner and outer surfaces of the casing and the insert. When the plastics material has set, the mould insert is removed, whereby the inner surface of the moulded plastics defines the separating chamber 16 with the inner ends of the pipes 8 opening into the larger cross-sectioned end of the chamber 16. The separator body is completed by means of metal end plates 10,12 welded to the respective ends of the casing 4, the end plate 10 carrying an overflow outlet tube 13 defining overflow outlet 18 and the end plate 12 carrying an underflow outlet tube 15 which defines underflow outlet 20. Although in the embodiment shown, there are two inlet pipes, in an alternative construction only a single inlet pipe may be provided.

Preferably, the plastics is a solid polyurethane which has good resistance to abrasion and is corrosion-proof.

For most applications, the separator body is mounted within an outer pressure vessel as shown at 17.

The described construction has been advanced merely by way of explanation and many modifications may be made thereto without departing from the spirit and scope of the invention as defined in the appended claims.

I claim:

1. Fluid flow apparatus comprising means for providing parallel operation from series operation and vice versa, including, two devices which are in use subjected to a fluid flow therethrough, from an inlet to an outlet, the inlets of the devices being connected to a common inlet duct and the outlets of the devices being connected to a common outlet duct; said apparatus also including a connecting duct interconnecting said inlet duct and said outlet duct, at locations respectively between the connections of inlets of the devices to the inlet duct and between the connections of the outlets of the devices to the outlet duct, and valve means selectively operable to direct fluid to be separated, and passed into said inlet duct, through the inlet of each device from said inlet duct, whilst directing fluid emerging from said outlets to said outlet duct, said valve means also being selectively operable to divert said fluid passed into said inlet duct from direct passage from the inlet duct to the inlet of one of said devices, whilst permitting inlet to the inlet of the other device and to direct fluid from the outlet of the other device, and entering into the outlet duct, through said connecting duct and thence to the inlet of said one device via said inlet duct, and whilst preventing fluid emerging from the outlet of said other device from mixing in said outlet duct with fluid from the outlet of said one device.

2. Fluid flow apparatus as claimed in claim 1 wherein the inlet and outlet ducts are arranged in generally parallel relationship, with the valve means comprising a first valve in said inlet duct and a second valve in said outlet duct, said first valve being at a location between spaced locations at which the respective inlets of the two devices join the inlet duct, whereby the inlet duct defines first and second portions to respective opposite sides of the first valve, and said second valve being at a location between spaced locations at which the outlets of the two devices join the outlet duct, whereby the outlet duct defines first and second portions to respective opposite sides of the second valve, said valves being interconnected by said connecting duct, said first valve being effective, in one condition, to direct fluid entering said first portion of the inlet duct successively through the first and second portions of the inlet duct for entry into the inlets of the two devices then coupled in parallel and the first valve being effective in another condition to block flow from the first portion of the inlet duct to the second portion thereof, whilst permitting flow from the connecting duct through the first valve means into the second portion of the inlet duct and precluding such flow to the first portion of the inlet duct, the second valve being effective, in one condition, to permit fluid flow between the first and second portions of the outlet duct to direct flow from both devices, when coupled in parallel, to the outlet duct and, in another condition, being effective to direct fluid flowing from said other device, into said first portion of the outlet duct, from the first portion of the outlet duct into said connecting duct and to prevent flow from the first to the second portion of the outlet duct; at least one of said valves, or another valve forming part of said valve means, being effective to prevent flow through the connecting duct when the first and second valves are in said one conditions.

3. Fluid flow apparatus as claimed in claim 2 wherein the devices are coupled to the inlet and outlet ducts by further valves, and are demountable from the apparatus, with the said further valves closed.

4. Fluid flow apparatus as claimed in claim 2 wherein the devices comprise axially extending cyclone separators with inlets for inflow of fluid to be separated, and having axially opposed underflow and overflow outlets for outlet of respective dense and less dense components of separated fluid, the said inlet of each device comprising the inlet of a respective cyclone separator and the outlet of each device comprises the underflow outlet of a respective cyclone separator.

5. Fluid flow apparatus as claimed in claim 1 wherein the devices are coupled to the inlet and outlet ducts by further valves, and are demountable from the apparatus, with the said further valves closed.

6. Fluid flow apparatus as claimed in claim 5 wherein the devices comprise axially extending cyclone separators with inlets for inflow of fluid to be separated, and having axially opposed underflow and overflow outlets for outlet of respective dense and less dense components of separated fluid, the said inlet of each device comprising the inlet of a respective cyclone separator and the outlet of each device comprises the underflow outlet of a respective cyclone separator.

7. Fluid flow apparatus as claimed in claim 1 wherein the devices comprise axially extending cyclone separators with inlets for inflow of fluid to be separated, and having axially opposed underflow and overflow outlets for outlet of respective dense and less dense components of separated fluid, the said inlet of each device comprising the inlet of a respective cyclone separator and the outlet of each device comprises the underflow outlet of a respective cyclone separator.

8. In a separator apparatus having two cyclone separators of the kind having an axially extending elongate separating chamber with a side inlet at one end for inlet of fluid to be separated, an overflow outlet at said one end of the separating chamber for outlet of a less dense component of said fluid, and an underflow outlet at another end of said separating chamber opposite said one end, for outlet of a more dense component said fluid, said separators extending in side by side relationship and having the inlets interconnected with the common inlet duct, at said one ends of the separators, and said underflow outlets connected with a common outlet duct at said other ends of the said separators; flow control means to vary the flow pattern for the fluid to be separated between a condition for parallel flow through the separators and a condition for series flow through the separators, said flow control means comprising:

- means for providing parallel operation from series operation and vice versa, including,
- a connecting duct interconnecting said inlet duct and said outlet duct, at locations respectively between the connection of inlets of the separators to the inlet duct and between the connections of the underflow outlets of the separators to the outlet duct, and valve means selectively operable to direct the fluid to be separated, and passed into said inlet duct, whilst directing fluid emerging from said underflow outlets to said outlet duct, said valve means also being selectively operable to divert said fluid to be separated and passed into said inlet duct from direct passage from the inlet duct to the inlet of one of said separators, whilst permitting inlet of the fluid to be separated to the inlet of the other separator and to direct fluid from the underflow outlet of the other separator, and entering into the outlet duct, through said connecting duct and thence to the inlet of said one separator via said inlet duct, and whilst preventing fluid emerging from the underflow outlet of said other separator from mixing in said outlet duct with fluid from the underflow outlet of said one separator.

9. Separator apparatus as claimed in claim 8, wherein the inlet and outlet ducts are arranged in generally parallel relationship, the valve means comprising a first valve in said inlet duct and a second valve in said outlet duct, said first valve being at a location between spaced locations at which the respective inlets of the two separators join the inlet duct, whereby the inlet duct defines first and second portions to respective opposite rides of the first valve, and said second valve being at a location between spaced locations at which the underflow outlets of the two separators join the outlet duct, whereby the outlet duct defines first and second portions to respective opposite sides of the second valve, said valves being interconnected by said connecting duct, said first valve being effective, in one condition, to direct fluid entering said first portion of the inlet duct successively through the first and second portions of the inlet duct for entry into the inlets of the two separators and the first valve being effective in another condition to block flow from the first portion of the inlet duct to the second portion thereof, whilst permitting flow from the connecting duct through the first valve means into the second portion of the inlet duct and precluding such flow to the first portion of the inlet duct, the second valve being effective in one condition, to permit fluid flow between the first and second portions of the outlet duct to direct flow from the underflow outlets of both separators, to the outlet duct and, in another condition, being effective to direct fluid flowing from said other separator, into said first portion of the outlet duct, from the first portion of the outlet duct into said connecting duct and to prevent flow from the first to the second portion of the outlet duct; at least one of said valves being effective to prevent flow through the connecting duct when the first and second valves are in said one conditions, whereby said flow pattern is conditioned for said parallel flow when the valves are in said one conditions, and for said series flow when said valves are in said another conditions.

10. Separator apparatus as claimed in claim 8 wherein the inlet and outlet ducts are arranged in generally parallel relationship, the valve means comprising a first valve in said inlet duct and a second valve in said outlet duct, said first valve being at a location between spaced locations at which the respective inlets of the two separators join the inlet duct, whereby the inlet duct defines first and second portions to respective opposite sides of the first valve, and said second valve being at a location between spaced locations at which the underflow outlets of the two separators join the outlet duct, whereby the outlet duct defines first and second portions to respective opposite sides of the second valve, said valves being interconnected by said connecting duct, said first valve being effective, in one condition, to direct fluid entering said first portion of the inlet duct successively through the first and second portions of the inlet duct for entry into the inlets of the two separators and the first valve being effective in another condition to block flow from the first portion of the inlet duct to the second portion thereof, whilst permitting flow from the connecting duct through the first valve means into the second portion of the inlet duct and precluding such flow to the first portion of the inlet duct, the second valve being effective in one condition, to permit fluid flow between the first and second portions of the outlet duct to direct flow from the underflow outlets of both separators, to the outlet duct and, in another condition, being effective to direct fluid flowing from said other separator, into said first portion of the outlet duct, from the first portion of the outlet duct into said connecting duct and to prevent flow from the first to the second portion of the outlet duct; said valve means including a further valve effective to prevent flow through the connecting duct when the first and second valves are in said one conditions, whereby said flow pattern is conditioned for said parallel flow when the valves are in said one conditions, and for said series flow when said valves are in said another conditions.

11. Separator apparatus as claimed in claim 8, wherein the separators are coupled to the inlet and outlet ducts by further valves, and are demountable from the apparatus, with the said further valves closed.

12. In a separator apparatus having two cyclone separators of the kind having an axially extending elongate separating chamber with an inlet at one end for inlet of fluid to be separated, a first outlet from the separating chamber for outlet of one separated component of said fluid, and a second from the separators chamber at another end of said separating chamber opposite said inlet, for outlet of another separator component of said fluid, said separators extending in side by side relationship and having the inlets interconnected with the common inlet duct, at said one ends of the separators, and said second outlets connected with a common outlet duct at said other ends of the separators; for control means to vary the flow pattern for the fluid to be separated between a condition for parallel flow through the separators and a condition for series flow through the separators, said flow control means comprising:

- means for providing parallel operation from series operation and vice versa, including,
- a connecting duct interconnecting said inlet duct and said outlet duct, at locations respectively between the connections of inlets of the separators to the inlet duct and between the connections of the second outlets of the separators to the outlet duct, and valve means selectively operable to direct the fluid to be separated, and passed into said inlet duct, whilst directing fluid emerging from said second outlets to said outlet duct, said valve means also being selectively operable to divert said fluid to be separated and passed into said inlet duct from direct passage from the inlet duct to the inlet of one of said separators, whilst permitting inlet of the fluid to be separated to the inlet of the other separator and to direct fluid from the second outlet of the other separator, and entering into the outlet duct, through said connecting duct and thence to the inlet of said one separator via said inlet duct, and whilst preventing fluid emerging from the second outlet of said other separator from mixing in said outlet duct with fluid from the second outlet of said one separator.

13. Separator apparatus as claimed in claim 12 wherein the inlet and outlet ducts are arranged in generally parallel relationship, the valve means comprising a first valve in said inlet duct and a second valve in said outlet duct, said first valve being at a location between spaced locations at which the respective inlets of the two separators join the inlet dut, whereby the inlet duct defines first and second portions to respective opposite sides of the first valve, and said second valve being at a location between spaced locations at which the second outlets of the two separators join the outlet dut, whereby the outlet duct defines first and second portions to respective opposite sides of the second valve, said valves being interconnected by said connecting duct, said first valve being effective, in one condition, to direct fluid entering said first portion of the inlet duct successively through the first and second portions of the inlet duct for entry into the inlets of the two separators and the first valve being effective in another condition to block flow from the first portion of the inlet duct to the second portion thereof, whilst permitting flow from the connecting duct through the first valve means into the second portion of the inlet duct and precluding such flow to the first portion of the inlet duct, the second valve being effective in one condition, to permit fluid flow between the first and second portions of the outlet duct to direct flow from the second outlets of both separators, to the outlet duct and, in another condition, being effective to direct fluid flowing from said other separator, into said first portion of the outlet duct, from the first portion of the outlet duct into said connecting duct and to prevent flow from the first to the second portion of the outlet duct; at least one of said valves being effective to prevent flow through the connecting duct when the first and second valves are in said one conditions, whereby said flow pattern is conditioned for said parallel flow when the valves are in said one conditions, and for said series flow when said valves are in said another conditions.

14. Separator apparatus as claimed in claim 13 wherein the separators are coupled to the inlet and outlet ducts by further valves, and are demountable from the apparatus, with the said further valves closed.

15. Separator apparatus as claimed in claim 12 wherein the inlet and outlet ducts are arranged in generally parallel relationship, the valve means comprising a first valve in said inlet duct and a second valve in said outlet duct, said first valve being at a location between spaced locations at which the respective inlets of the two separators join the inlet dut, whereby the inlet duct defines first and second portions to respective opposite sides of the first valve, and said second valve being at a location between spaced locations at which the second outlets of the two separators join the outlet dut, whereby the outlet duct defines first and second portions to respective opposite sides of the second valve, said valves being interconnected by said connecting duct, said first valve being effective, in one condition, to direct fluid entering said first portion of the inlet duct successively through the first and second portions of the inlet duct for entry into the inlets of the two separators and the first valve being effective in another condition to block flow from the first portion of the inlet duct to the second portion thereof, whilst permitting flow from the connecting duct through the first valve means into the second portion of the inlet duct and precluding such flow to the first portion of the inlet duct, the second valve being effective in one condition, to permit fluid flow between the first and second portions of the outlet duct to direct flow from the second outlets of both separators, to the outlet duct and, in another condition, being effective to direct fluid flowing from said other separator, into said first portion of the outlet duct, from the first portion of the outlet duct into said connecting duct and to prevent flow from the first to the second portion of the outlet duct; said valve means including a further valve effective to prevent flow through the connecting duct when the first and second valves are in said one conditions, whereby said flow pattern is conditioned for said parallel flow when the valves are in said one conditions, and for said series flow when said valves are in said another conditions.

16. Separator apparatus as claimed in claim 15 wherein the separators are coupled to the inlet and outlet ducts by further valves, and are demountable from the apparatus, with the said further valves closed.

17. Separator apparatus as claimed in claim 12 wherein the separators are coupled to the inlet and outlet ducts by further valves, and are demountable from the apparatus, with the said further valves closed.

18. Separator apparatus as claimed in claim 17 wherein said first outlet of each said separator is an aerial overflow outlet for outlet of a less dense separated component of said fluid, said overflow outlet being at said one end of the respective separator, and said second outlet is an underflow outlet for outlet of a more dense separated component of said fluid, said underflow outlet being at said another end of said separating chamber.

19. Separator apparatus as claimed in claim 12, wherein said first outlet of each said separator is an aerial overflow outlet for outlet of a less dense separated component of said fluid, said overflow outlet being at said one end of the respective separator, and said second outlet is an underflow outlet for outlet of a more dense separated component of said fluid, said underflow outlet being at said another end of said separating chamber.

* * * * *

UNITED STATES PATENT AND TRADEMARK OFFICE

CERTIFICATE OF CORRECTION

PATENT NO. : 4,737,287

DATED : April 12, 1988

INVENTOR(S) : Gavan J.J. Prendergast

It is certified that error appears in the above-identified patent and that said Letters Patent are hereby corrected as shown below:

Column 8, line 21, change "the" (second occurrence) to --a--.
Column 8, line 24, change "other" to another--.
Column 8, line 38, before "whilst", insert -- through the inlet of each separator from said inlet duct-- .
Column 9, line 9, insert a comma after "effective"

Column 9, line 12 delete the comma after "separators".
Column 9, line 48, insert a comma after "effective".
Column 9, line 51, delete the comma after "separators"

Column 10, line 4, after "second" insert --outlet-- and change "separators" to --separating--.
Column 10, line 8, change "the" (second occurrence) to --a--.
Column 10, line 11, change "other" to --another--.
Column 10, line 25, before "whilst", insert --through the inlet of each separator from said inlet duct--.
Column 10, line 46, change "dut" to --duct--.
Column 10, line 50, change "dut" to --duct--.
Column 10, line 64, insert a comma after --effective--.
Column 10, line 67, delete the comma after "separators".
Column 11, line 21, change "dut" to --duct--.
Column 12, line 24, change "aerial" to --axial--.

UNITED STATES PATENT AND TRADEMARK OFFICE
CERTIFICATE OF CORRECTION

PATENT NO. : 4,737,287

DATED : April 12, 1988

INVENTOR(S) : Gavan J. J. Prendergast

It is certified that error appears in the above-identified patent and that said Letters Patent is hereby corrected as shown below:

Column 12, line 33, change "aerial" to -- axial --.

Signed and Sealed this

Third Day of January, 1989

*Attest:*

DONALD J. QUIGG

*Attesting Officer*

*Commissioner of Patents and Trademarks*